Patented June 22, 1937

2,084,933

UNITED STATES PATENT OFFICE 2,084,933

ASPHALT VARNISH

Alfonso M. Alvarado, Wilmington, Del., assignor to E. I. du Pont de Nemours & Company, Wilmington, Del., a corporation of Delaware No Drawing. Application September 26, 1935, Serial No. 42,355

6 Claims. (Cl. 91—68)

This invention relates to the art of coating and more particularly to improved asphaltic coating compositions especially useful in the manufacture of automobile top material and similar artificial leather products.

Rubber coated fabrics are especially suitable for making various kinds of artificial leather products such as automobile top materials. A problem that has been of great concern to the manufacturers of artificial leather for use as automobile top material is that of the development of a finish for said material which is as durable as the finish on the car with respect to freedom from chalking, cracking, and premature dulling. Another problem has been that of combining excellent durability, as indicated above, with high initial luster, good color, and hiding qualities. Among the most successful finishes proposed for this purpose are those containing asphalt, particularly those containing petroleum asphalt such as disclosed and claimed in U. S. 1,795,199, issued to J. R. Couture. While the prior art petroleum asphalt varnishes have good luster retention, they fail to meet fully the requirements of an automobile top material in respect to initial flexibility, toughness, and hiding power. Inasmuch as petroleum asphalts are limitedly compatible with bodied drying oils, the proportion of bodied drying oil that can be homogeneously combined therewith is definitely limited. Moreover, the luster retention qualities of petroleum asphalt-bodied drying oil varnishes fall off rapidly as the proportion of drying oil to asphalt is progressively increased. If sufficient bodied drying oil is added to the asphalt to give a finish which is flexible and tough initially, a finish is obtained which has low initial luster, and poor durability on outdoor exposure. It is evident, therefore, that so far as petroleum asphalts are concerned, their use in the manufacture of automobile top material finishes is limited to varnishes of relatively short oil length.

Another type of asphalt varnish used as a finish for automobile top material is that based on gilsonite. These varnishes have very desirable initial properties, since they have high initial luster and a deep black color. Moreover, gilsonite and bodied drying oils are compatible in practically all proportions, and for that reason there is practically no limitation to the gallon length varnish that can be prepared therewith. However, varnishes containing gilsonite as the main asphaltic constituent, below twenty gallons in oil length, are very brittle initially, and fail badly by dulling and chalking after a relatively short exposure to the weather. On the other hand, gilsonite-drying oil varnishes of longer gallon length than twenty gallons, while generally flexible initially, fail badly after only a relatively short exposure to the weather by chalking and developing large pattern checking. Failure by checking is very objectionable in a top material because it soon leads to leaking.

In co-pending application, Serial No. 705,458, filed January 5, 1934, gilsonite-drying oil varnishes varying from 20 to 70 gallons in oil length and pigmented with from 12 to 40% carbon black (based on the total solids content of the varnish) are described which show excellent durability upon prolonged exposure to the weather, but these varnishes in consequence of their high degree of pigmentation with carbon black fail to meet the desired requirement of high initial luster. I have now discovered that the addition of certain alcohols to the highly pigmented gilsonite varnishes just mentioned causes a marked improvement in initial luster of the film, without sacrificing its excellent durability.

This invention has as an object the production of gilsonite-drying oil varnishes highly pigmented with carbon black which have better initial luster than similar varnishes previously available. Another object is the production of artificial leather products comprising a flexible fabric sheeting base provided with a suitable undercoat and having a top coating of the varnish just mentioned.

The above and other objects appearing hereinafter are accomplished by incorporating into a gilsonite-drying oil varnish of the kind disclosed and claimed in co-pending application, Serial No. 705,458, previously referred to, a small amount of a long chain aliphatic monohydric alcohol or the mixed alcohols obtained by carboxylic reduction of natural fats, fatty acids, and fatty oils of animal and vegetable origin.

The alcohols which are added to the asphalt varnish in the practice of this invention are saturated aliphatic monohydric alcohols of ten to twenty carbon atoms in chain length. Alcohols having less than ten atoms do not produce the desired effect, one reason among others being their relatively high vapor pressure which causes the alcohol to leave the film. The alcohols having more than 20 atoms are unsuitable because they melt at too high a temperature and because they are not sufficiently compatible with the oils. It is preferred to use the mixture of these alcohols as they are obtained by carboxylic reduction of natural fats, fatty acids, and fatty oils of vegetable origin. The mixture of alcohols obtained by the carboxylic reduction and saturation of sperm oil is particularly effective. The reduction of the ester groups and of the unsaturated linkages in this oil results in a mixture of alcohols which consists almost wholly of alcohols containing from ten to twenty carbon atoms as shown by the following analyses:

| | Per cent |
|---|---|
| Decyl alcohol | 1.0 |
| Dodecyl alcohol | 4.6 |
| Tetradecyl alcohol | 12.3 |
| Hexadecyl alcohol | 42.1 |
| Eicosyl alcohol | 13.2 |
| $C_{22}$ alcohols | 0.4 |

The highly pigmented gilsonite varnishes, which are described in the mentioned application and which are improved by the alcohols referred to above, contain carbon black in an amount not less than 12% of the combined weight of the gilsonite and oil but should not contain more carbon black than the weight of the oil constituent less one and one-fourth of the weight of the gilsonite. When the composition contains an inert pigment (China clay, asbestine, etc.) in addition to the carbon black, the total amount of pigment should not exceed about 55% and preferably should not be over about 40% of its total solids content. Thus, in a thirty gallon varnish which contains 240 pounds of oil to 100 pounds of asphalt the maximum and minimum amount of carbon black by the above definition would be about 41 and 115 pounds, respectively. The total amount of pigment that can be used, if inert pigment is also included, is preferably not over about 40% of the total solids content of the varnish. The total solids content in the present case is 240 pounds of oil plus 100 pounds of asphalt plus total pigment. In varnishes varying between 30 and 40 gallons in oil length I prefer to use about 20 to 30% carbon black and in varnishes varying from 40 to 70 gallons in oil length up to about 40% carbon black.

It is to be noted that the improved luster retention and resistance to chalking by means of heavy pigmentation with carbon black is most unusual because increased pigmentation, as pointed out in the aforementioned application, has been thought of in the art as accompanying increased chalking. In fact, a gilsonite varnish containing 10% carbon black, which would be considered a heavily pigmented varnish, shows upon test but slight improvement in luster retention and chalking over a similar unpigmented varnish.

The most useful of the highly pigmented gilsonite varnishes described herein are those of from 20 to 70 gallon oil length. By a gallon length in the varnish trade is meant a gallon of oil to 100 pounds of gum. Accordingly, a "gallon oil length" as used herein designates 8 pounds of oil per 100 pounds of asphalt and my compositions therefore contain from about 160 to 560 pounds of oil per 100 pounds of asphalt.

The above described varnishes are conveniently prepared by blending a gilsonite-drying oil varnish with a grind of the pigment in the varnish, incorporating therein the desired amount of drier, and then adding the agent in the form of a solution in an organic solvent. While the drier is preferably a soluble iron organic compound any of the usual varnish driers may also be used. As an alternative method, a varnish is prepared by heat-treating the oil or oils with the drier and subsequently blending with the required amount of gilsonite. A pigment dispersion is prepared by grinding the desired pigment into this varnish in the presence of the agent. The finished varnish is made by subsequently adding unpigmented varnish to the pigment dispersion containing the agent. The thinners employed for making the solution of the gilsonite and the solution of the oils and agent may consist of mineral spirits, toluene, turpentine, solvent naphtha, or mixtures thereof.

The following examples illustrate a practical method for carrying out my invention.

*Example I*

| | Parts by weight |
|---|---|
| Gilsonite | 9.98 |
| Bodied linseed oil | 11.73 |
| Bodied China-wood oil | 10.33 |
| Iron resinate (7.2% iron) | 1.66 |
| Prussian blue (45.5% iron) | 0.26 |
| Carbon black | 7.98 |
| Mixture of alcohols from carboxyl reduction and saturation of sperm oil | 0.16 |
| Solvent naphtha | 57.90 |
| Total | 100.00 |

The above is approximately a 30 gallon varnish containing China-wood oil bodied with iron resinate, linseed oil bodied with the Prussian blue, approximately 19% carbon black (based on total solids), and 2% of the mixture of alcohols obtained by carboxyl reduction and saturation of sperm oil based on the carbon black. The varnish was made by adding the reduced sperm oil to the grind of pigment in the previously prepared 30 gallon gilsonite-drying oil varnish, and then diluting said pigment grind with clear 30 gallon gilsonite-drying oil varnish to the desired pigment content.

The above varnish was used as a single-coat baked finish for rubber coated fabrics and had a very high initial luster, was deep black in color, and dried to a tough dry film. After six months' exposure to the weather, the varnish showed practically no tendency to chalk and had excellent luster retention. On the other hand, an otherwise identical but unpigmented gilsonite-drying oil varnish failed badly by chalking after approximately one month's exposure to the weather.

An otherwise identical varnish to the above but without the mixture of alcohols obtained by carboxyl reduction and saturation of sperm oil, while it had excellent luster retention characteristics upon outdoor exposure, had definitely lower initial luster. The improvement in initial luster obtained with the mixture of alcohols obtained by carboxyl reduction and saturation of sperm oil is of a wholly unexpected order of magnitude. This makes it possible to utilize these highly durable gilsonite-drying oil varnishes heavily pigmented with carbon black as single-coat bright finishes for carriage cloth.

Example II

| | Parts by weight |
|---|---|
| Gilsonite | 7.06 |
| Bodied linseed oil | 13.46 |
| Bodied China-wood oil | 11.86 |
| Iron resinate (7.2% iron) | 1.91 |
| Prussian blue (45.5% iron) | 0.30 |
| Carbon black | 8.04 |
| Solvent naphtha | 57.21 |
| Mixture of alcohols from carboxyl reduction and saturation of sperm oil | 0.16 |
| Total | 100.00 |

The above varnish, prepared in the same way as that of Example I, is approximately a 50 gallon varnish containing China-wood oil bodied with iron resinate, linseed oil bodied with Prussian blue, approximately 19% carbon black (based on total solids), and 2% of the mixture of alcohols obtained by carboxyl reduction and saturation of sperm oil based on the carbon black.

The varnish of the foregoing example was used as a single-coat baked finish for a rubber coated fabric, and had very high initial luster and a deep black color. After six months' exposure to the weather the finish retained its initial luster practically unchanged and showed no evidence of chalking. An otherwise identical but unpigmented varnish failed by chalking and dulling in less than one month's exposure. A varnish identical to the above but without the mixture of alcohols obtained by carboxyl reduction and saturation of sperm oil had definitely inferior luster, and was therefore unsatisfactory as a bright single-coat finish for carriage cloth.

In the manufacture of artificial leather products, such as automobile top material the base of which is usually a rubber coated fabric, the varnishes are preferably applied over the uncured rubber, and the varnish dried by heating the system at a temperature which is suitable for the vulcanization of the rubber. In a modification of this process, which gives even better results in respect to initial appearance and durability, the varnishes are applied over an intermediate coat of oil varnish. In the one coat system outlined above, it is usual to bake at 240° F. to 270° F. for two to four hours to vulcanize the rubber and dry the varnish. In the two coat system, the intermediate coat of oil varnish is usually dried by baking at 240° F. to 270° F. for fifteen to thirty minutes, the final coat of highly pigmented gilsonite varnish applied, and the system baked at 240° F. to 270° F. for two to four hours to vulcanize the rubber and dry the final coat of asphalt varnish. The particular temperature at which the system is baked in either the one coat or two coat systems, is determined by the composition of the rubber compound. Valuable artificial leather products may also be made by applying the gilsonite varnish over an oil, pyroxylin, or organic cellulose ester (cellulose ether, ethyl cellulose, etc.) composition.

In referring to the oil constituent of the varnish, the term "drying oil" as used herein means the natural drying or semi-drying oils, the synthetic oils including the synthetic mixed glycerides and the oil modified polyhydric alcohol-polycarboxylic acid resins which when synthesized in the presence of relatively large amounts of oil or oil acids may be viewed as modified drying oils. These latter products may be made by heat-treating a mixture of the fatty oil and polyhydric alcohol and heat-treating the resulting material with polycarboxylic acid. If the oil acids are used these may be heated simultaneously with the other ingredients.

By the term "gilsonite" as used herein, I mean a species of natural bitumen including dark colored, comparatively hard, and relatively non-volatile solids, composed principally of saturated hydrocarbons, substantially free from oxygenated bodies and crystallizable paraffins, sometimes associated with mineral matter, the non-mineral constituents being soluble in carbon bisulfide, carbon tetrachloride, benzene, and other aromatic hydrocarbons.

The mixture of alcohols used in the foregoing examples may be replaced by the isolated individual saturated aliphatic monohydric alcohols of ten to twenty carbon atoms such as dodecyl, oleyl, octadecyl, cetyl, ceryl or myricyl alcohols. The alcohols obtained by carboxyl reduction and saturation of sperm oil, and of fatty oils as well as of fatty oil acids, such as oleic acid, China-wood oil acids, oleic acid, etc., may also be used advantageously in the practice of this invention. The results obtained with the mixture of alcohols resulting from the carboxyl reduction and saturation of sperm oil are, however, markedly superior to those obtained with the individual alcohols or with the mixture of alcohols obtained from other oils or oil acids.

It is to be observed that the free alcohols should be used to obtain the desired improvement in luster. Wetting and dispersing agents, such as the acid phthalates and the sodium or potassium salts of the acid sulfates from the alcohols obtained from carboxylic reduction of animal and vegetable oils and fatty acids, although useful in improving the flowing properties of the varnish do not cause any appreciable improvement in the initial luster of the film.

The proportion of agent should generally be no less than about 1% based on the carbon black content of the varnish, but the exact proportion will vary with the type of agent used. With the alcohols obtained by saturation and carboxylic reduction of sperm oil I generally prefer to use about 2%, based on the carbon black content of the varnish. With the alcohols obtained by carboxylic reduction of oleic acid, larger amounts are required in order to obtain comparable results.

The varnishes of this invention, whether air dried or baked, are particularly useful as finishes for rubber coated fabrics such as are used in automobile tops, rubber upholstery, etc. These varnishes may also be used as top dressings and in fender enamels.

The gilsonite varnishes of the present invention in addition to the important properties of freedom from chalking and long retention of original luster upon exposure to the weather which are possessed by the varnishes described in the mentioned application Serial No. 705,458 are characterized by a high initial luster which makes it possible to utilize the varnishes claimed herein in applications for which the varnishes described in the aforementioned application are unsuited, for instance in the production of single-coat bright finishes for carriage cloth, as patent leather finishes, bright baking enamels, etc.

As many apparently widely different embodiments of this invention may be made without departing from the spirit and scope thereof, it is to be understood that I do not limit myself to the specific embodiments thereof except as defined in the appended claims.

I claim:

1. A gilsonite-drying oil varnish highly pigmented with carbon black and containing a small amount of saturated aliphatic monohydric alcohol having from ten to twenty carbon atoms.

2. A gilsonite-drying oil varnish highly pigmented with carbon black and containing the mixture of alcohols obtained by carboxylic reduction and saturation of sperm oil.

3. A gilsonite-drying oil varnish pigmented with carbon black, the drying oil and gilsonite being being present in the proportion of from about 160 to 560 pounds of the drying oil vehicle per 100 pounds of gilsonite, the carbon black being present in an amount not less than about 12% of the combined weight of the gilsonite and oil vehicle, and not more than the weight of the oil less one and one-fourth the weight of the gilsonite, said varnish containing saturated aliphatic monohydric alcohol having from ten to twenty carbon atoms.

4. A gilsonite-drying oil varnish pigmented with carbon black, the drying oil and gilsonite being present in the proportion of from about 160 to 560 pounds of the drying oil vehicle per 100 pounds of gilsonite, the carbon black being present in an amount not less than about 12% of the combined weight of the gilsonite and oil vehicle, and not more than the weight of the oil less one and one-fourth the weight of the gilsonite, said varnish containing the mixture of alcohols obtained by carboxylic reduction and saturation of sperm oil.

5. As an article of manufacture a coated fabric sheeting having a top coating of dried varnish comprising gilsonite, drying oil vehicle, carbon black, and saturated aliphatic monohydric alcohol having from ten to twenty carbon atoms, the drying oil vehicle and gilsonite being present in the proportion of from about 160 to 560 pounds of the drying oil vehicle per 100 pounds of gilsonite, the carbon black being present in an amount not less than about 12% of the combined weight of the gilsonite and oil vehicle, and not more than the weight of the oil less one and one-fourth the weight of the gilsonite.

6. A process for making artificial leather which comprises applying to a coated fabric a top coating of varnish comprising gilsonite, drying oil vehicle, carbon black, and saturated aliphatic monohydric alcohol having from ten to twenty carbons atoms, the drying oil vehicle and gilsonite being present in the proportion of from about 160 to 560 pounds of the drying oil vehicle per 100 pounds of gilsonite, the carbon black being present in an amount not less than about 12% of the combined weight of the gilsonite and oil vehicle, and not more than the weight of the oil less one and one-fourth the weight of the gilsonite, and baking the resulting product.

ALFONSO M. ALVARADO.